United States Patent
Herring et al.

(10) Patent No.: US 6,324,327 B1
(45) Date of Patent: Nov. 27, 2001

(54) LOW DISPERSION SLOPE NEGATIVE DISPERSION OPTICAL FIBER

(75) Inventors: James B. Herring; David K. Smith, both of Wilmington, NC (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/694,966

(22) Filed: Oct. 24, 2000

Related U.S. Application Data

(60) Provisional application No. 60/167,082, filed on Nov. 23, 1999.

(51) Int. Cl.[7] .............................. G02B 6/02; G02B 6/22
(52) U.S. Cl. ............................................ 385/123; 385/127
(58) Field of Search ..................................... 385/123, 127

(56) References Cited

U.S. PATENT DOCUMENTS

| | | | |
|---|---|---|---|
| 5,721,800 | 2/1998 | Kato et al. | 385/127 |
| 5,852,701 | 12/1998 | Kato et al. | 385/127 |
| 6,072,929 | 6/2000 | Kato et al. | 385/123 |
| 6,084,993 | 7/2000 | Mukasa | 385/24 |
| 6,205,279 * | 3/2001 | Kim et al. | |

FOREIGN PATENT DOCUMENTS

| | | |
|---|---|---|
| 0 902 307 A1 | 3/1999 | (EP) . |
| 0 909 964 A1 | 4/1999 | (EP) . |
| 2768233 | 9/1998 | (FR) . |
| WO 97/33188 | 9/1997 | (WO) . |
| WO 99/26094 | 5/1999 | (WO) . |

* cited by examiner

Primary Examiner—Hung N. Ngo
(74) Attorney, Agent, or Firm—William J. Chervenak

(57) ABSTRACT

Disclosed is a segmented core optical waveguide fiber having low total dispersion slope and negative total dispersion over an extended wavelength window. A wavelength window of particular interest is that in the range of about 1500 nm to 1600 nm. The waveguide fibers in accordance with the invention also have cabled cut off wavelength below about 1480 nm and attenuation at 1550 nm of less than 0.22 dB/km. Mode field diameter is maintained essentially at the nominal value for dispersion shifted waveguide fiber, i.e., 7.7 μm to 8.7 μm. Embodiments having a center segment and a first and a second annular segment are discussed in detail.

10 Claims, 2 Drawing Sheets

LOW DISPERSION SLOPE NEGATIVE DISPERSION OPTICAL FIBER

This application claims priority to and the benefit of U.S. Provisional Patent Application No. 60/167,082, filed Nov. 23, 1999.

BACKGROUND OF THE INVENTION

1. Field of the Invention

The present invention relates generally to an optical waveguide fiber having a dispersion zero shifted to higher wavelengths, and particularly to such a fiber that has negative total dispersion.

2. Technical Background

In response to demands for high performance waveguide fibers having properties compatible with particular communications systems, investigation of segmented core optical waveguide refractive index profiles has continued. For example in U.S. Pat. No. 5,483,612, Gallagher et al., (the '612 patent) there is disclosed a core profile design which provides low polarization mode dispersion, low attenuation, a shifted dispersion zero, and low dispersion slope. Other core refractive index profiles have been designed to meet the requirements of applications that include the use of higher power signals or optical amplifiers.

A problem that can arise when a core profile is altered in order to arrive at a desired property is that the property is realized at the expense of one or more other essential properties. For example, a certain core refractive index profile design may provide lower total dispersion slope, thus allowing for wavelength division multiplexing over an extended wavelength range. However, in achieving low total dispersion slope, attenuation may be seriously compromised, or cut off wavelength can be moved out of an acceptable range. Thus, core profile design is an exacting task, in which model studies usually precede the manufacturing stage of product development.

There is a need in the art to continue the study of refractive index profiles in order to better understand interaction among profile variables and thus to arrive at profile variable combinations that provide optical waveguide fibers having a set of desired properties.

DEFINITIONS

The following definitions are in accord with common usage in the art.

The refractive index profile is the relationship between refractive index and waveguide fiber radius.

A segmented core is one that is divided into at least a first and a second waveguide fiber core portion or segment. Each portion or segment is located along a particular radial length, is substantially symmetric about the waveguide fiber centerline, and has an associated refractive index profile.

The radii of the segments of the core are defined in terms of the respective refractive indexes at respective beginning and end points of the segments. The definitions of the radii used herein are explained with reference to FIG. 1. In FIG. 1, the radius of the center index segment 10 is the length 2 that extends from the waveguide centerline to the point at which the profile becomes the α-profile of segment 12, that is, the point at which the refractive index versus radius curve begins to follow the equation, set forth below, for an α-profile. The outer radius 4 of segment 12 extends from the centerline to the radial point at which the extrapolated descending portion of the α-profile crosses the extrapolated extension of profile segment 14. This definition is readily applied to alternative center segments such as α-profiles or step index profiles. Further, the definition is readily applied to those cases wherein the second segment has a shape other than that of an α-profile. In cases where alternative center segment shapes are used, the radii are illustrated in a separate drawing. The radius 6 of segment 14 extends from the centerline to the radius point at which the Δ% is half the maximum value of the Δ% of segment 16. The radii of additional segments are defined analogously to that of segment 14 until reaching the final core segment. The midpoint radius 8 of segment 16, the final segment of the core as illustrated in FIG. 1, is measured from the centerline to the midpoint of the width of the segment. The width of a segment such as segment 16 extends between the two half Δ% values at the opposing portions of segment 16. The clad layer of the fiber is shown as 17 in FIG. 1. The radii of the next to last segment are found from the geometry of adjoining segments. The inner radius of the next to last segment is the outer radius of the preceding segment. The outer radius of the next to last segment is the center radius of the last segment minus one half the width of the final segment.

The term α-profile refers to a refractive index profile, expressed in terms of Δ(b)%, where b is radius, which follows the equation, $$\Delta(b)\% = \Delta(b_o)(1-[|b-b_o|]/(b_1-b_o)]^\alpha),$$

where $b_o$ is the point at which Δ(b)% is maximum, $b_1$ is the point at which Δ(b)% is zero, and b is in the range $b_i \leq b \leq b_f$, where delta is defined above, $b_i$ is the initial point of the α-profile, $b_f$ is the final point of the α-profile, and α is an exponent which is a real number. The initial and final points of the α-profile are selected and entered into the computer model. As used herein, if an α-profile is preceded by a step index profile or any other profile shape, the beginning point of the α-profile is the intersection of the α-profile and the step or other profile.

Total dispersion is the sum of material dispersion, waveguide dispersion, and inter-modal dispersion. In single mode waveguide fiber, there is no intermodal dispersion. The sign convention used for total dispersion is that total dispersion is positive if shorter wavelengths travel faster in the waveguide fiber than do longer wavelengths. The converse is true for relative speed of light wavelengths in the case of negative total dispersion.

Mode field diameter is found using the Peterman II definition which is known in the art.

Cabled cut off wavelength is the wavelength above which the waveguide fiber propagates a single mode, where the fiber is in cabled form.

SUMMARY OF THE INVENTION

One aspect of the present invention is a single mode optical waveguide fiber having a segmented core region surrounded by and in contact with a clad layer. The relative indexes of the core region and the clad layer are selected to provide a fiber structure that guides light. The core region includes a center segment and at least one annular segment surrounding and in contact with the center segment. The index profiles of the segments of the core region are selected to provide a waveguide fiber having total dispersion slope over a preselected wavelength range less than or equal to about 0.07 ps/nm²-km, total dispersion at 1560 nm in the range of about −3.4 ps/nm-km to −1.0 ps/nm-km, mode field diameter in the range of about 7.7 μm to 8.7 μm, cabled cut off wavelength less than or equal to about 1480 nm, and, attenuation at 1550 less or equal to about 0.22 dB/km.

In an embodiment of the invention, the waveguide fiber is designed for operation in a wavelength window spanning 1500 nm to 1600 nm. Thus the total dispersion slope is substantially constant over this operating window, and the attenuation does not vary by more than about 0.05 dB/km over this window In a further embodiment of the invention, the center segment is divided into a first portion which includes the centerline of the waveguide and a second portion which is an annulus surrounding the first portion. The respective profiles of the portions and the at least one annular segment are selected from the group consisting of an α-profile, a step, a rounded step, a trapezoid, and a rounded trapezoid. A preferred profile for the centerline portion is a rounded step. A preferred profile for the annular portion is an α-profile having an α in the range of about 0.8 to 8.

In yet another preferred embodiment of the invention the centerline portion is an α-profile having a in the range of about 0.8 to 1.5 and the center annular portion is an α-profile having an α in the range of about 1 to 6.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Reference will now be made in detail to the present preferred embodiments of the invention, examples of which are illustrated in the accompanying drawings. An exemplary embodiment of the segmented core optical waveguide fiber of the present invention is shown in FIG. 2.

In accordance with the invention, the present invention for a segmented core optical waveguide fiber includes a center segment and at least one annular segment surrounding and in contact with the center segment. The configuration of the segments of the core provide a waveguide fiber of particular use in undersea systems in which negative total dispersion is preferred and low total dispersion slope is desired in order to allow for an extended wavelength window of operations. The subject optical waveguide fiber has, over a wavelength window of about 1500 nm to 1600 nm and a dispersion slope of less than or equal to 0.07 ps/nm$^2$-km. The total dispersion at 1560 nm is in the range of about −3.4 ps/nm-km to −1.0 ps/nm-km. The low total dispersion slope and negative dispersion at 1560 nm are achieved without sacrificing attenuation performance, which is less than about 0.22 dB/km at 1550 nm, or mode field diameter, which is in the range of about 7.7 μm to 8.7 μm. These waveguide fiber properties are achieved while maintaining cabled cut off wavelength below about 1480 nm.

Figure 1:
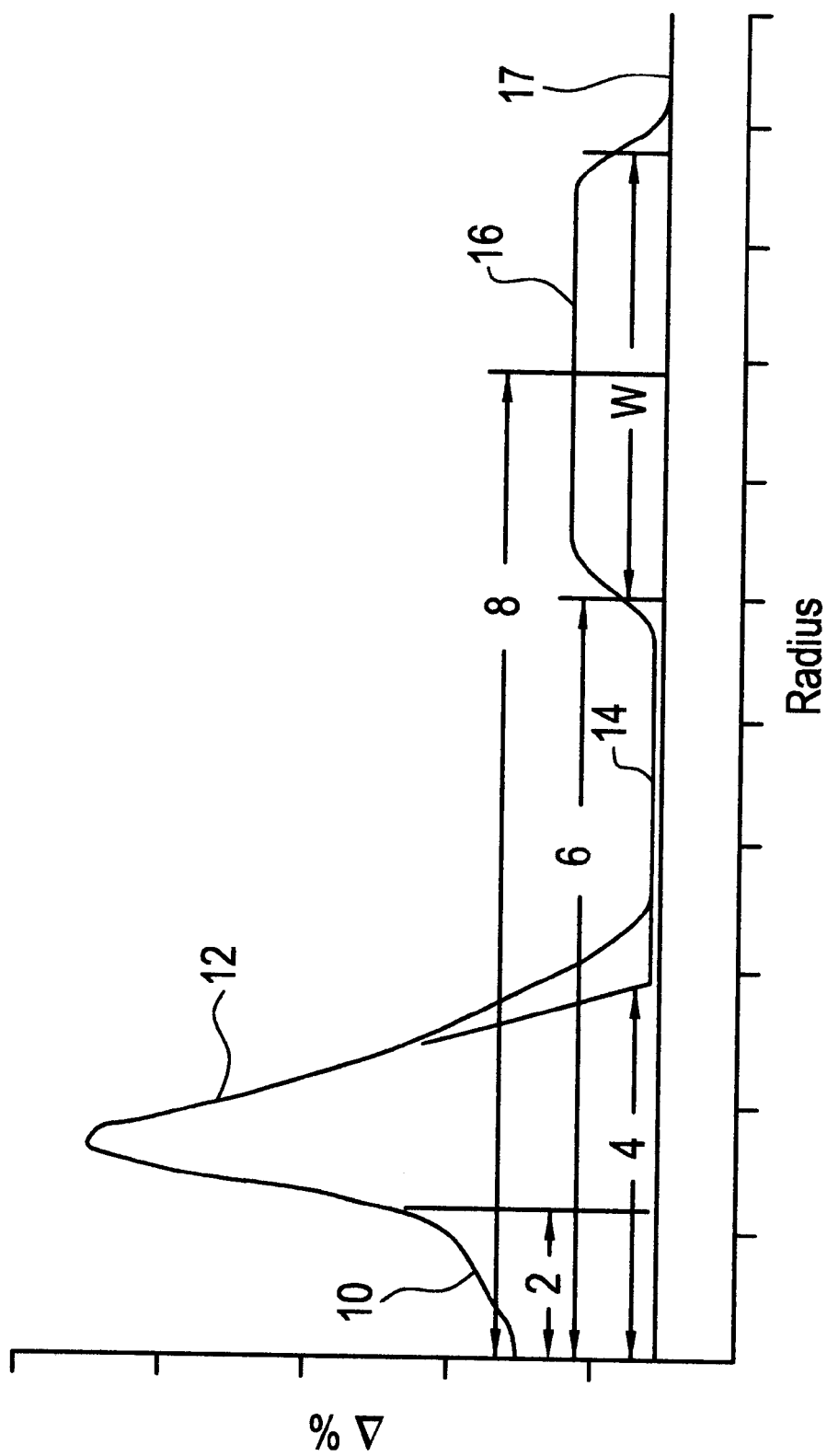
FIG. 1 is a chart of a refractive index profile wherein the definitions of radii and widths of the segments are provided.
Figure 2:
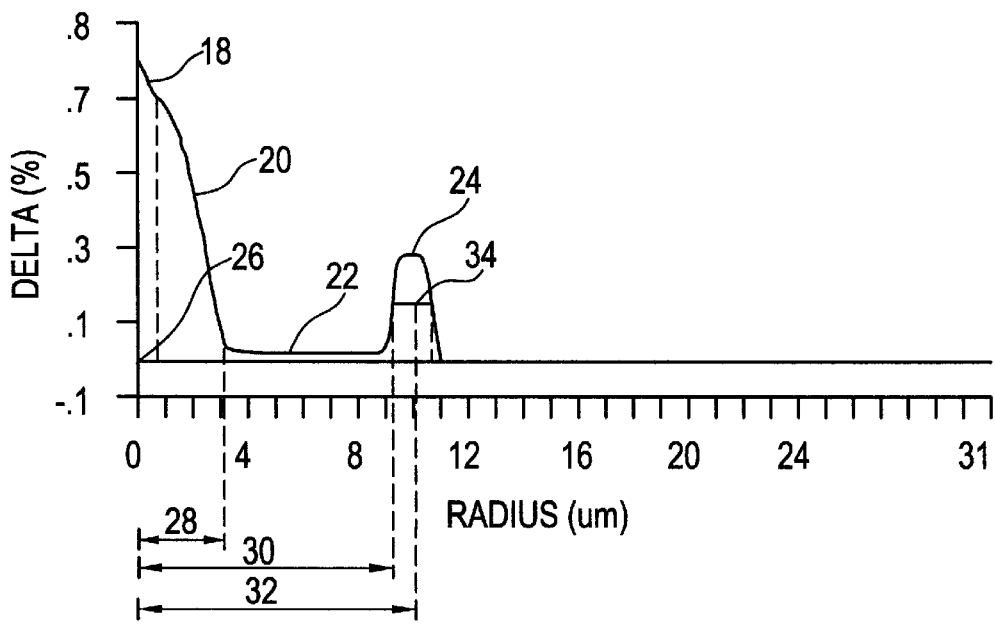
FIG. 2 is a chart of a refractive index profile of a waveguide fiber made in accordance with the invention.

As embodied herein, and depicted in FIG. 2, the waveguide fiber includes a core region having a center segment which includes a centerline portion 18 and a center annular portion 20. The centerline portion 18 is an aprofile having a in the range of about 0.8 to 1.5 and the center annular portion 20 is an α-profile having an α in the range of about 1 to 6. The centerline portion and the center annular portion have respective relative index percents in the range of about 0.40% to 0.85% and 0.49% to 0.78%. The respective outer radii 26 and 28 of portions 18 and 20 are in the range of about 0.17 μm to 1.62 μm and 2.33 μm to 3.22 μm.

The center segment is surrounded by first annular segment 22 having a rounded step profile and a relative index percent in the range of about 0 to 0.07%. The inner radius of segment 22 is identical to radius 28. The outer radius 30 of segment 22 is found using the dimensions of the second annular segment 24 that surrounds the first annular segment 22. The second annular segment 24 has a rounded step profile and relative index in the range of about 0.035% to 0.70%. The center radius 32 of the second annular segment is in the range of about 7.7 μm to 10.8 μm and width 34 is in the range of about 0.50 μm to 2.5 μm.

The modeled parameters of a waveguide fiber made in accordance with the embodiment described immediately above are, total dispersion slope over a wavelength range of 1500 nm to 1600 nm of 0.0513 ps/nm$^2$-km, total dispersion at 1560 nm of −2.21 ps/nm-km, mode field diameter of 8.19 μm, cabled cut off wavelength less than or equal to about 1480 nm, and, attenuation at 1550 nm of 0.200 dB/km. Zero dispersion wavelength is 1603.0 nm.

Figure 3:
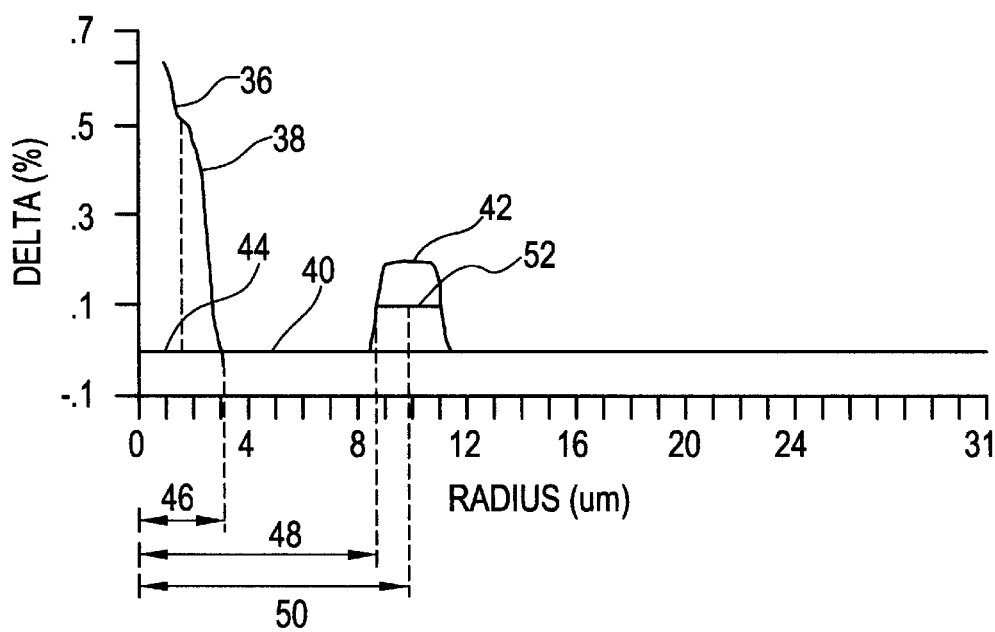
FIG. 3 is a chart of a refractive index profile of a waveguide fiber made in accordance with the invention.

In the embodiment depicted in FIG. 3, the waveguide fiber includes a core region having a center segment which includes a centerline portion 36 and a center annular portion 38. The centerline portion 36 is a rounded step and the center annular portion 38 is an α-profile having an α in the range of about 0.08 to 8. The centerline portion 36 and the center annular portion 38 have respective relative index percents in the range of about 0.54% to 0.67% and 0.49% to 0.70%. The respective outer radii 44 and 46 of portions 36 and 38 are in the range of about 1.02 μm to 1.50 μm and 2.56 μm to 3.22 μm.

The center segment is surrounded by first annular segment 40 having a rounded step profile and a relative index percent of about 0. The inner radius of segment 40 is identical to radius 46. The outer radius 48 of segment 40 is found using the dimensions of the second annular segment 42 that surrounds the first annular segment 40. The second annular segment 42 has a rounded step profile and relative index in the range of about 0.18% to 0.30%. The center radius 50 of the second annular segment is in the range of about 8.1 μm to 9.92 μm and width 52 is in the range of about 1.50 μm to 2.41 μm.

The modeled parameters of a waveguide fiber made in accordance with the embodiment described immediately above are, total dispersion slope over a wavelength range of 1500 nm to 1600 nm of 0.0499 ps/nm$^2$-km, total dispersion at 1560 nm −2.47 ps/nm-km, mode field diameter of 8.58 μm, cabled cut off wavelength less than or equal to about 1480 nm, and, attenuation at 1550 nm of 0.201 dB/km. Zero dispersion wavelength is 1609.5 nm.

EXAMPLE 1

A waveguide fiber was made in accordance with FIG. 3. The centerline portion 36 and the center annular portion 38 had respective relative index percents of 0.91% and 0.70%. The respective outer radii 44 and 46 of portions 36 and 38 were 0.36 µm to 2.88 µm. First annular segment 40 had a rounded step profile and a relative index percent of 0.004%. The second annular segment 42 had a rounded step profile and relative index in the range of 0.214%. The center radius 50 of the second annular segment was 9.268 µm and width 52 was 2.25 µm.

The measured properties of the waveguide fiber were, dispersion slope over a wavelength range of about 1500 nm to 1600 nm of 0.048 ps/nm$^2$-km, mode field diameter 7.97 µm, cabled cut off wavelength 1322 nm, and attenuation at 1550 nm of 0.201 dB/km.

EXAMPLE 2

A second waveguide fiber was made in accordance with FIG. 3. The centerline portion 36 and the center annular portion 38 had respective relative index percents of 0.83% and 0.35%. The respective outer radii 44 and 46 of portions 36 and 38 were 0.35 µm to 2.76 µm. First annular segment 40 had a rounded step profile and a relative index percent of 0.006%. The second annular segment 42 had a rounded step profile and relative index in the range of 0.199%. The center radius 50 of the second annular segment was 9.121 µm and width 52 was 2.50 µm.

The measured properties of the waveguide fiber were, dispersion slope over a wavelength range of about 1500 nm to 1600 nm of 0.065 ps/nm$^2$-km, mode field diameter 8.76 µm, cabled cut off wavelength 1131 nm, and attenuation at 1550 nm of 0.206 dB/km.

Comparison of examples 1 and 2 indicates mode field diameter increased as second annular segment refractive index percent decreased slightly and was moved inward toward the centerline of the waveguide fiber. Dispersion slope increased for the configuration of example 2. However, the chief conclusion to be drawn from the two examples is that the desired fiber characteristics as set forth above and recited in claim 1 are achieved for changes in waveguide fiber parameters which are within manufacturing tolerances. The ease of manufacture of this segmented core waveguide fiber design makes it particularly attractive as a commercial product.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

We claim:

1. A single mode optical waveguide fiber comprising:
   a core region surrounded by and in contact with a clad layer,
      wherein the core region and the clad layer each have respective refractive index profiles and are configured to guide light through the waveguide fiber; wherein,
   the core region includes a center segment and at least one annular segment surrounding and in contact with said center segment, each said segment having a refractive index profile and a relative index percent; wherein,
   the respective refractive index profiles of said center segment and said at least one annular segment are configured to provide waveguide fiber properties;
   total dispersion slope over a pre-selected wavelength range less than or equal to about 0.07 ps/nm$^2$-km,
   total dispersion at 1560 nm in the range of about −3.4 ps/nm-km to −1.0 ps/nm-km,
   mode field diameter in the range of about 7.7 µm to 8.7 µm, cabled cut off wavelength less than or equal to about 1480 nm, and, attenuation at 1550 less or equal to about 0.22 dB/km.

2. The single mode waveguide of claim 1 wherein the pre-selected wavelength is in the range of about 1500 nm to 1600 nm.

3. The single mode waveguide of claim 1 wherein said center segment includes a centerline portion and a center annular portion surrounding said centerline portion, each said portion having a refractive index profile and a relative index percent.

4. The single mode wave guide of claim 3 wherein the respective index profiles of said first and second portion of said center segment and said at least one annular segment are selected from the group consisting of an α-profile, a step, a rounded step, a trapezoid, and a rounded trapezoid.

5. The single mode waveguide of claim 4 wherein said centerline portion is a rounded step profile and said center annular portion is an α-profile having an α in the range of about 0.8 to 8.

6. The single mode waveguide of claim 5 wherein said centerline portion and said center annular portion have respective relative index percents in the range of about 0.54% to 0.67% and 0.49% to 0.70% and respective outer radii in the range of about 1.02 µm to 1.50 µm and 2.56 µm to 3.22 µm.

7. The single mode waveguide of claim 6 wherein said core region comprises a first and a second annular segment, said first annular segment being a rounded step profile and having a relative index percent of about zero, said second annular segment being a rounded step profile and having relative index percent in the range of about 0.18% to 0.30%, a center radius in the range of 8.1 µm to 9.92 µm and a width in the range of about 1.50 µm to 2.41 µm.

8. The single mode waveguide of claim 4 wherein said centerline portion is an α-profile having α in the range of about 0.8 to 1.5 and said center annular portion is an α-profile having an α in the range of about 1 to 6.

9. The single mode waveguide of claim 8 wherein said centerline portion and said center annular portion have respective relative index percents in the range of about 0.40% to 0.85% and 0.49% to 0.78% and respective outer radii in the range of about 0.17 µm to 1.62 µm and 2.33 µm to 3.22 µm.

10. The single mode waveguide of claim 9 wherein said core region comprises a first and a second annular segment, said first annular segment being a rounded step profile and having a relative index percent in the range of about 0 to 0.07%, said second annular segment being a rounded step profile and having relative index percent in the range of about 0.035% to 0.70%, a center radius in the range of 7.7 µm to 10.8 µm and a width in the range of about 0.50 µm to 2.5 µm.

* * * * *